United States Patent
Albidah

(10) Patent No.: US 12,552,714 B2
(45) Date of Patent: Feb. 17, 2026

(54) SYNTHESIS OF ALKALI-ACTIVATED COMPOSITES INCORPORATING LARGE QUANTITIES OF ELECTRIC ARC FURNACE DUST

(71) Applicant: KING SAUD UNIVERSITY, Riyadh (SA)

(72) Inventor: Abdulrahman Sulaiman Albidah, Riyadh (SA)

(73) Assignee: KING SAUD UNIVERSITY, Riyadh (SA)

( * ) Notice: Subject to any disclaimer, the term of this patent is extended or adjusted under 35 U.S.C. 154(b) by 0 days.

(21) Appl. No.: 18/619,822

(22) Filed: Mar. 28, 2024

(65) Prior Publication Data
US 2025/0304499 A1    Oct. 2, 2025

(51) Int. Cl.
C04B 28/26    (2006.01)
C04B 7/24    (2006.01)
(Continued)

(52) U.S. Cl.
CPC ............... *C04B 28/26* (2013.01); *C04B 7/24* (2013.01); *C04B 2103/0006* (2013.01); *C04B 2111/00017* (2013.01)

(58) Field of Classification Search
None
See application file for complete search history.

(56) References Cited

U.S. PATENT DOCUMENTS

| | | | |
|---|---|---|---|
| 9,481,604 B2 | 11/2016 | Fares et al. | |
| 2014/0264140 A1* | 9/2014 | Gong | C04B 28/006 106/676 |
| 2024/0051874 A1* | 2/2024 | Witt | C04B 22/066 |

FOREIGN PATENT DOCUMENTS

| | | | | |
|---|---|---|---|---|
| CN | 109265141 A | * | 1/2019 | ......... C04B 33/1352 |
| EP | 3950636 A1 | * | 2/2022 | ........... C04B 28/006 |

(Continued)

OTHER PUBLICATIONS

Rafat Siddique, Wear Resistance of High-Volume Fly Ash Concrete, Dec. 2010, Leonardo Journal of Sciences, Issue 17, p. 21-36 (Year: 2010).*

(Continued)

*Primary Examiner* — Susan D Leong
*Assistant Examiner* — Xinwen Ye
(74) *Attorney, Agent, or Firm* — Nath, Goldberg & Meyer; Joshua B. Goldberg

(57) ABSTRACT

A method for synthesizing metakaolin-based alkali-activated composites with improved fresh and mechanical properties over previous methods. This can be achieved, for example, by employing waste from the steel production industry, i.e., the metakaolin in the composites can be replaced by electric-arc furnace dust (EAFD) at high replacement levels (up to 90%). The replacement by EAFD (1-90%) can elongate the setting time, improve the mix flowability/workability, enhance the compressive strength, reduce the water to binder content and/or alkaline solution needed for the binder activation of alkali-activated composites. Additionally, another embodiment relates to a procedure for producing alkali-activated composites with 100% EAFD. In addition to solving issues related to the manufacturing of metakaolin-based alkali-activated composites, or similar composites thereof, the present subject matter provides a way to dispose of hazardous EAFD in large quantities.

10 Claims, 5 Drawing Sheets

(51) Int. Cl.
C04B 103/00 (2006.01)
C04B 111/00 (2006.01)

(56) References Cited

FOREIGN PATENT DOCUMENTS

| JP | 2000189923 A | * | 7/2000 |
| JP | 2006222104 A | * | 8/2006 |
| JP | 2017113730 A | * | 6/2017 |

OTHER PUBLICATIONS

Laura M. Simonyan, The EAF dust chemical and phase composition research techniques, Feb. 19, 2019, Journal of Materials Research and Technology, 2 0 1 9;8(2):1601-1607 (Year: 2019).*
Materials Journal, Investigation of Properties of Engineered Cementitious Composites Incorporating High Volumes of Fly Ash and Metakaolin; Sep. 1, 2012.
Journal of Cleaner Production, Performance and Durability Properties of Self-Compacting Mortars With Electric Arc Furnace Dust as Filler; May 10, 2019.
Journal of Building Engineering, Optimization of Geopolymer Mortar Incorporating Heavy Metals in Producing Dense Hybrid Composites; Nov. 2020.
Buildings, The Effect of Electric Arc Furnace Dust (EAFD) on Improving Characteristics of Conventional Concrete; Jun. 14, 2023.

* cited by examiner

SYNTHESIS OF ALKALI-ACTIVATED COMPOSITES INCORPORATING LARGE QUANTITIES OF ELECTRIC ARC FURNACE DUST

BACKGROUND

1. Field

The disclosure of the present patent application relates to a method of synthesizing alkali-activated composites.

2. Description of the Related Art

Alkali-activated or geopolymer composites have gained popularity over time due to their environmental benefits. Alkali-activated binders are used to produce cementitious composites. The alkali-activated composites rely on activating binder (i.e., source) materials, which are usually rich in silicon and aluminium, by an alkaline activator. A range of natural and by-product source materials have been proposed, including fly ash, slag, red mud, kaolin, metakaolin, rice husk ash, etc. Similarly, alkaline activators are generally a combination of sodium silicate and sodium hydroxide or potassium silicate and potassium hydroxide. Geopolymers or alkali-activated composites have the potential to substitute conventional cement binders. Compared to Portland cement, geopolymer or alkali-activated materials can be more sustainable and have less negative environmental impact.

Metakaolin produced by the calcination of natural raw kaolin has been commonly employed by various researchers for producing geopolymer composites, including pastes, mortars, and concrete. A key concern in the production of a metakaolin-based geopolymer is its poor flowability or workability properties, which necessitates incorporating higher amounts of water. However, the presence of a higher content of water requires increasing the amount of alkaline activators to maintain a proper concentration of the alkaline solution and, therefore, attain proper compressive strength. Importantly, the excessive use of alkaline activators can reduce the mix economy and result in poor durability properties. Interestingly, chemical admixtures, including superplasticizers developed for Portland cement binders, are inefficient options in the production of metakaolin-based geopolymers.

During steel production by electric arc furnaces, two by-products are generated: electric arc furnace slag (EAFS) and electric arc furnace dust (EAFD). For each ton of steel produced, about 15-20 kg of EAFD is generated. In 2009, the EAFD produced worldwide was about 6 metric tons (ST), with only 2.5 ST recycled. The EAFD chemistry, although it varies largely based on the materials used in the production, primarily contains Zn (4-37%), Fe (37-49%), Ca (2-5%), Pb (1-2%), and small amounts of less than 1% of various metals, including Cu, Cd, Cr, and Al.

Due to the presence of heavy metals in EAFD, it has been classified as a hazardous waste by many environmental agencies. Leaching of heavy metals and groundwater contamination are examples of key concerns when EAFD is disposed of in landfills, in addition to many other negative environmental impacts. Recycling is a possible way to control the EAFD waste. However, some recycling and/or treatment practices are not economically feasible and hence are limiting factors which result in the need to continue the practice of landfilling the EAFD.

In one embodiment, EAFD can be used as a partial replacement of various binders in alkali-activated or geopolymer composites. The performance of EAFD addition in fly ash and rice husk ash alkali-activated mortars at percentages of 10%, 15%, and 20% has been investigated. At 28 days, the mixes containing EAFD showed a reduced compressive strength compared to the control mix having no EAFD. Various composites have been synthesized containing EAFD at 10%, 20%, and 30% in fly ash-based geopolymer pastes. It was revealed that EAFD addition resulted in a reduction in the compressive strength, with the reduction in the strength increasing with the increased content of EAFD. EAFD has been employed in alkali-activated paste mixes with fly ash as a primary binder material blended with secondary materials, including slag, kaolinite, or metakaolinite. Researchers have replaced slag by EAFD in alkali-activated paste mixes. The replacement percentages varied from 1-7%. It was noted that the replacement of slag by EAFD caused a loss of compressive strength. Researchers have also synthesized alkali-activated mortars using a binder material composed of metakaolin, $Ca(OH)_2$, and different percentages of EAFD. The study considered the compressive strength and micro-structure analyses. The results showed that the presence of 20% EAFD in the mortar mix caused a reduction in the compressive strength.

Research has shown recycling EAFD in construction applications, including employment as a partial replacement of cement in the production of various cementitious composites. The addition of EAFD to conventional cement concrete can improve many fresh and hardened properties of the resulting composite. The addition of EAFD in relatively small amounts can result in an improvement in the compressive strength of the composite, while higher amounts may decrease the compressive strength of the composite.

Thus, a new solution for reuse of EAFD is desired.

SUMMARY

The present subject matter relates to a method for synthesizing metakaolin-based alkali-activated composites with improved fresh and mechanical properties. This can be achieved, for example, by employing waste from the steel production industry, i.e., the metakaolin in the composites can be replaced by electric-arc furnace dust (EAFD) at high replacement levels (up to 90%). The replacement by EAFD (1-90%) can elongate the setting time, improve the mix flowability/workability, enhance the compressive strength, reduce the water to binder content, and/or alkaline solution needed for the binder activation of alkali-activated composites. Additionally, another embodiment relates to a procedure for producing alkali-activated composites with 100% EAFD. In addition to solving issues related to the manufacturing of metakaolin-based alkali-activated composites, or similar composites thereof, the present subject matter provides a way to dispose of hazardous EAFD in large quantities.

Accordingly, in an embodiment, the present subject matter relates to a method of making an alkali-activated composite, the method comprising: mixing metakaolin with EAFD or taking EAFD alone to obtain a binder; adding an alkaline solution to the binder; mixing the alkaline solution and the binder to form a homogenous mixture; adding sand to the homogenous mixture to create a second mixture; mixing the second mixture until the second mixture is homogenous; casting the second mixture into a mold; and curing the second mixture to form the alkali-activated composite.

In another embodiment, the present subject matter relates to a method for disposal of electric-arc furnace dust (EAFD) by conversion into an alkali activated composite, the method comprising: mixing an amount of metakaolin and an amount of EAFD or taking EAFD alone to obtain a binder; adding an alkaline solution to the binder; mixing the alkaline solution and the binder to form a homogenous mixture; adding sand to the homogenous mixture to create a second mixture; mixing the second mixture until the second mixture is homogenous; casting the second mixture into a mold; and curing the second mixture to form the alkali-activated composite.

These and other features of the present subject matter will become readily apparent upon further review of the following specification.

DETAILED DESCRIPTION OF THE PREFERRED EMBODIMENTS

Figure 1:
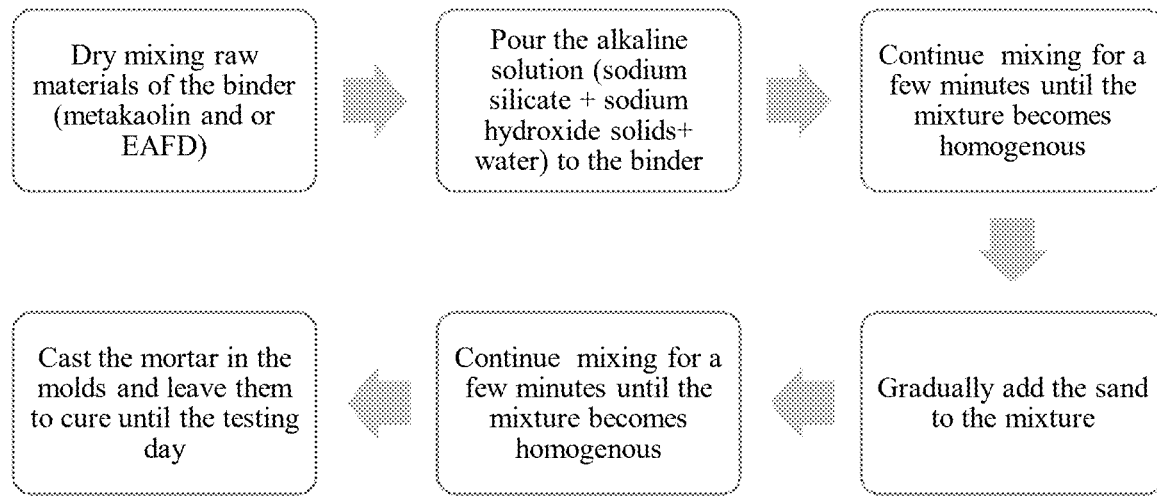
FIG. 1 illustrates the synthesis procedure for the alkali-activated mortar mixes containing EAFD.

The following definitions are provided for the purpose of understanding the present subject matter and for construing the appended patent claims.

Definitions

Throughout the application, where compositions are described as having, including, or comprising specific components, or where processes are described as having, including, or comprising specific process steps, it is contemplated that compositions of the present teachings can also consist essentially of, or consist of, the recited components, and that the processes of the present teachings can also consist essentially of, or consist of, the recited process steps.

It is noted that, as used in this specification and the appended claims, the singular forms "a", "an", and "the" include plural references unless the context clearly dictates otherwise.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a composition or a method described herein can be combined in a variety of ways without departing from the spirit and scope of the present teachings, whether explicit or implicit herein.

The use of the terms "include," "includes", "including," "have," "has," or "having" should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10% variation from the nominal value unless otherwise indicated or inferred.

The term "optional" or "optionally" means that the subsequently described event or circumstance may or may not occur, and that the description includes instances where said event or circumstance occurs and instances in which it does not.

Unless defined otherwise, all technical and scientific terms used herein have the same meaning as commonly understood to one of ordinary skill in the art to which the presently described subject matter pertains.

Where a range of values is provided, for example, concentration ranges, percentage ranges, or ratio ranges, it is understood that each intervening value, to the tenth of the unit of the lower limit, unless the context clearly dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter.

Throughout the application, descriptions of various embodiments use "comprising" language. However, it will be understood by one of skill in the art, that in some specific instances, an embodiment can alternatively be described using the language "consisting essentially of" or "consisting of".

For purposes of better understanding the present teachings and in no way limiting the scope of the teachings, unless otherwise indicated, all numbers expressing quantities, percentages or proportions, and other numerical values used in the specification and claims, are to be understood as being modified in all instances by the term "about". Accordingly, unless indicated to the contrary, the numerical parameters set forth in the following specification and attached claims are approximations that may vary depending upon the desired properties sought to be obtained. At the very least, each numerical parameter should at least be construed in light of the number of reported significant digits and by applying ordinary rounding techniques.

The present disclosure describes a method for synthesizing metakaolin-based alkali-activated composites with improved fresh and mechanical properties over previous methods. This can be achieved, for example, by employing waste from the steel production industry, i.e., the metakaolin in the composites can be replaced by electric-arc furnace dust (EAFD) at high replacement levels (up to 90%). The replacement by EAFD (1-90%) can elongate the setting time, improve the mix flowability/workability, enhance the compressive strength, reduce the water to binder content and/or alkaline solution needed for the binder activation of alkali-activated composites. Additionally, another embodiment relates to a procedure for producing alkali-activated composites with 100% EAFD. In addition to solving issues related to the manufacturing of metakaolin-based alkali-activated composites, or similar composites thereof, the present subject matter provides a way to dispose of hazardous EAFD in large quantities.

In one embodiment, the present subject matter relates to a method of making an alkali-activated composite, the method comprising: mixing two or more raw materials to obtain a binder; adding an alkaline solution to the binder; mixing the alkaline solution and the binder to form a homogenous mixture; adding sand to the homogenous mixture to create a second mixture; mixing the second mixture until the second mixture is homogenous; casting the second mixture into a mold; and curing the second mixture to form the alkali-activated composite.

In an embodiment of the present subject matter, the raw materials employed may include metakaolin and electric-arc furnace dust (EAFD). In various implementations, the EAFD may comprise 1 to 90% by weight of the binder. In other implementations, binder may constitute only EAFD (i.e., EAFD represents 100% of the binder).

In a further embodiment, the alkaline solution may include one or more of sodium silicate, and sodium hydroxide solids, with or without water.

In an embodiment, the chemical composition of the EAFD may include a combination of one or more of $Fe_2O_3$, ZnO, $Na_2O$, CaO, MgO, $K_2O$, $SiO_2$, $SO_3$, $Al_2O_3$, MnO, $P_2O_5$, $TiO_2$, $V_2O_5$, $Cr_2O_3$, PBO, CdO, F, and Cl.

In an additional embodiment, the mixtures can cure in the mold at a temperature of about 42° C.

In another embodiment, the present subject matter relates to a method for disposal of electric-arc furnace dust (EAFD) by conversion into an alkali activated composite, the method comprising: mixing an amount of metakaolin and an amount of EAFD to obtain a binder; adding an alkaline solution to the binder; mixing the alkaline solution and the binder to form a homogenous mixture; adding sand to the homogenous mixture to create a second mixture; mixing the second mixture until the second mixture is homogenous; casting the second mixture into a mold; and curing the second mixture to form the alkali activated composite.

In some embodiments, the EAFD can comprise 1-100% by weight of the binder.

In a further embodiment, the alkaline solution may include one or more of sodium silicate, and sodium hydroxide solids, with or without water.

In an embodiment, the EAFD chemical composition may include a combination of one or more of $Fe_2O_3$, ZnO, $Na_2O$, CaO, MgO, $K_2O$, $SiO_2$, $SO_3$, $Al_2O_3$, MnO, $P_2O_5$, $TiO_2$, $V_2O_5$, $Cr_2O_3$, PBO, CdO, F, and Cl.

The following examples illustrate the present teachings.

Example 1

Synthesis of Alkali-Activated Composite

The binder raw materials (metakaolin and/or EAFD) are mixed (using an electric mixer) with an alkaline solution for a few minutes until a homogenous mix is obtained. Sand is then gradually added with continuous mixing until the mixture becomes homogenous. Mortar is then poured into the mold and left to cure at an average temperature of 42° C. The mixing procedure is summarized in FIG. 1. The alkaline solution used is a mixture of sodium silicate solution, sodium hydroxide solids, and water. The mix proportions used are described in Table 1. However, the type and dosage of the alkaline solutions and or other mix proportions (for the synthesis of alkali-activated composites containing EAFD) can also be changed, which will affect the properties (depending on the needed application). Although mortar mixes are provided in this synthesis, concrete or paste mixes can also be manufactured.

TABLE 1

Proportions of various metakaolin/EAFD alkali-activated mortar mixes

| Mix No. | Binder (% wt) | | | | | ($Na_2SiO_3$ solution + NaOH solids)/binder (%) | NaOH solids/ $Na_2SiO_3$ solution (%) | water/binder (%) | Sand/ binder |
|---|---|---|---|---|---|---|---|---|---|
| | Metakaolin | EAFD-A | EAFD-B | EAFD-C | EAFD-D | | | | |
| B1 | 100 | 0 | 0 | 0 | 0 | 45.86 | 23.5 | 29.1 | 2.4 |
| B2 | 90 | 10 | 0 | 0 | 0 | 45.86 | 23.5 | 29.1 | 2.4 |
| B3 | 80 | 20 | 0 | 0 | 0 | 45.86 | 23.5 | 29.1 | 2.4 |
| B4 | 70 | 30 | 0 | 0 | 0 | 45.86 | 23.5 | 29.1 | 2.4 |
| B5 | 60 | 40 | 0 | 0 | 0 | 45.86 | 23.5 | 29.1 | 2.4 |
| B6 | 50 | 50 | 0 | 0 | 0 | 45.86 | 23.5 | 29.1 | 2.4 |
| B7 | 40 | 60 | 0 | 0 | 0 | 45.86 | 23.5 | 29.1 | 2.4 |
| B8 | 30 | 70 | 0 | 0 | 0 | 45.86 | 23.5 | 29.1 | 2.4 |
| B9 | 20 | 80 | 0 | 0 | 0 | 45.86 | 23.5 | 29.1 | 2.4 |
| B10 | 10 | 90 | 0 | 0 | 0 | 45.86 | 23.5 | 29.1 | 2.4 |
| B11 | 0 | 100 | 0 | 0 | 0 | 45.86 | 23.5 | 29.1 | 2.4 |
| B12 | 0 | 100 | 0 | 0 | 0 | 45.86 | 23.5 | 5.1 | 2.4 |
| B6/2 | 50 | 50 | 0 | 0 | 0 | 45.86 | 23.5 | 11.0 | 1.97 |
| B6/3 | 50 | 50 | 0 | 0 | 0 | 41.50 | 11.8 | 11.0 | 1.97 |
| B3/2 | 80 | 0 | 20 | 0 | 0 | 45.86 | 23.5 | 29.1 | 2.4 |
| B3/3 | 80 | 0 | 0 | 20 | 0 | 45.86 | 23.5 | 29.1 | 2.4 |
| B3/4 | 80 | 0 | 0 | 0 | 20 | 45.86 | 23.5 | 29.1 | 2.4 |

The binder raw materials used are metakaolin and/or EAPD. Pour samples of EAFD of different chemical compositions were used to validate the proposed invention and labeled as EAFD-A, EAFD-B, EAFD-C, and EAFD-D. The chemical composition of the metakaolin and various samples of EAPD are provided in Table 2.

TABLE 2

|  | EAFD-A | EAFD-B | EAFD-C | EAFD-D | Metakaolin |
|---|---|---|---|---|---|
| $Fe_2O_3$ | 37.9 | 38.19 | 51.59 | 33.44 | 2.11 |
| ZnO | 22.21 | 20.37 | 7.40 | 10.83 | 0.00 |
| $Na_2O$ | 9.54 | 8.71 | 4.78 | 8.77 | 0.28 |
| CaO | 8.21 | 8.01 | 17.00 | 21.71 | 1.29 |
| MgO | 5.45 | 4.98 | 7.36 | 10.75 | 0.13 |
| $K_2O$ | 3.98 | 3.73 | 1.51 | 4.13 | 0.38 |
| $SiO_2$ | 3.84 | 3.44 | 4.54 | 2.94 | 51.00 |
| $SO_3$ | 1.64 | 1.78 | 0.63 | 1.71 | 0.44 |
| $Al_2O_3$ | 0.45 | 0.39 | 1.74 | 0.72 | 42.63 |
| MnO | 1.69 | 1.65 | 0.96 | 1.15 | 0.01 |
| $P_2O_5$ | 0.32 | 0.28 | 0.18 | 0.2 | 0.05 |
| $TiO_2$ | 0.11 | 0.09 | 0.12 | 0.07 | 1.71 |
| $V_2O_5$ | 0.09 | 0.08 | 0.06 | 0.05 | — |
| $Cr_2O_3$ | 0.13 | 0.13 | 0.07 | 0.07 | — |
| PBO | 0.74 | 0.74 | 0.29 | 0.49 | — |
| CdO | — | 4.43 | — | — | — |
| F | 0.27 | 0.24 | — | 0.5 | — |
| Cl | 3.04 | 2.75 | 1.64 | 2.28 | — |

Chemical composition of metakaolin and various samples of EAFD (by wt %)

Example 2

Enhanced Flowability

Figure 2:
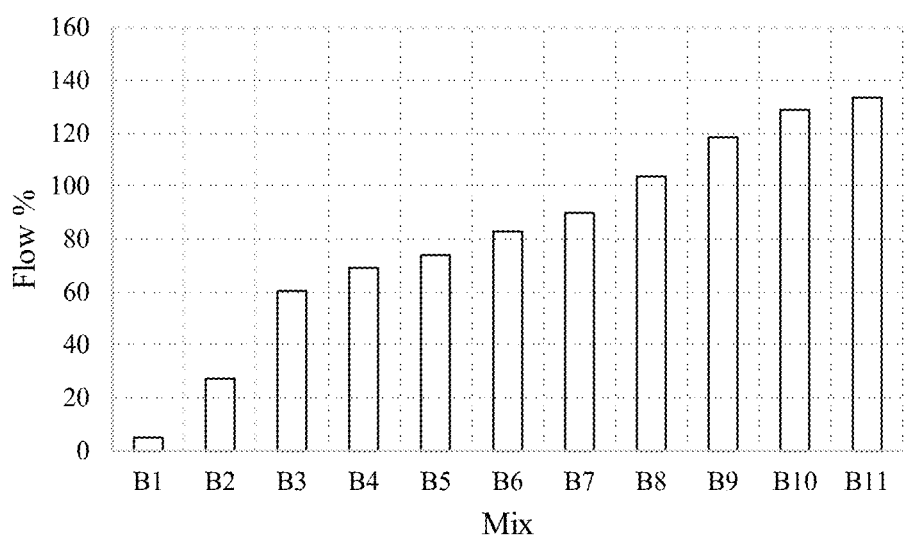
FIG. 2 illustrates the effect of EAFD content on the flowability of metakaolin/EAFD alkali-activated mixtures.
Figure 3:
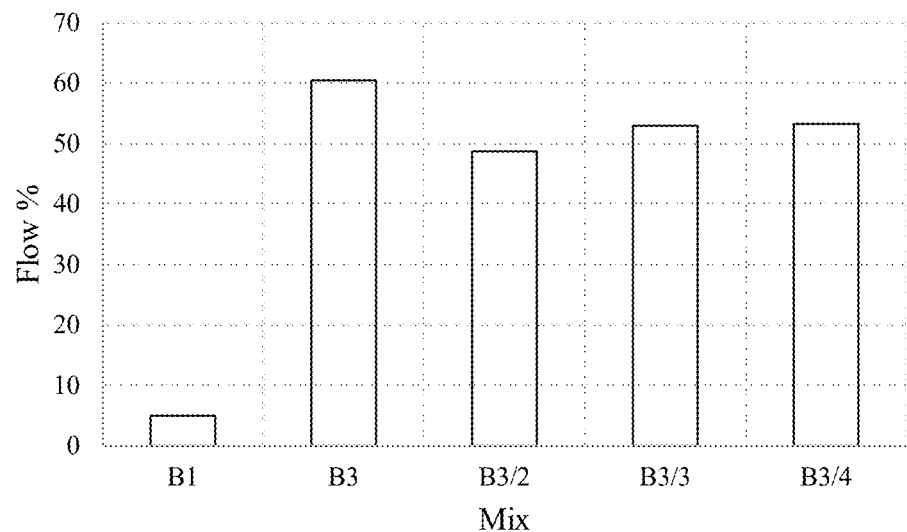
FIG. 3 illustrates the effect of EAFD type on the flowability of metakaolin/EAFD alkali-activated mixtures.

Utilizing EAFD in the production of alkali-activated mortar mixes containing metakaolin can significantly improve the mixture flowability, as depicted in FIG. 2, which presents the flow table test results. FIG. 2 shows the flowability for the mixes B1-B11 varying based on the EAFD percentage in the mix from 0 to 100% in a step of 10. It is seen from the figure that substituting metakaolin by EAFD in metakaolin-based geopolymer mixes can significantly improve their flowability/workability. The sensitivity of the flowability to the variation in the chemical composition of the EAFD is shown in FIG. 3. The figure shows the comparison of the flowability for the mix with 0% EAFD and mixes having 20% EAFD-A, 20% EAFD-B, 20% EAFD-C and 20% EAFD-D. Despite some variation in the flowability among the mixes incorporating EAFD, all four mixes containing EAFD showed an improvement in the flowability as compared to the mix having 0% EAFD. Therefore, EAFD can be employed in metakaolin-based geopolymer mixes to enhance the mix's workability/flowability without the need for extra water that weakens the mechanical properties of the mix.

Example 3

EAFD as Setting Time Retarder

Figure 4:
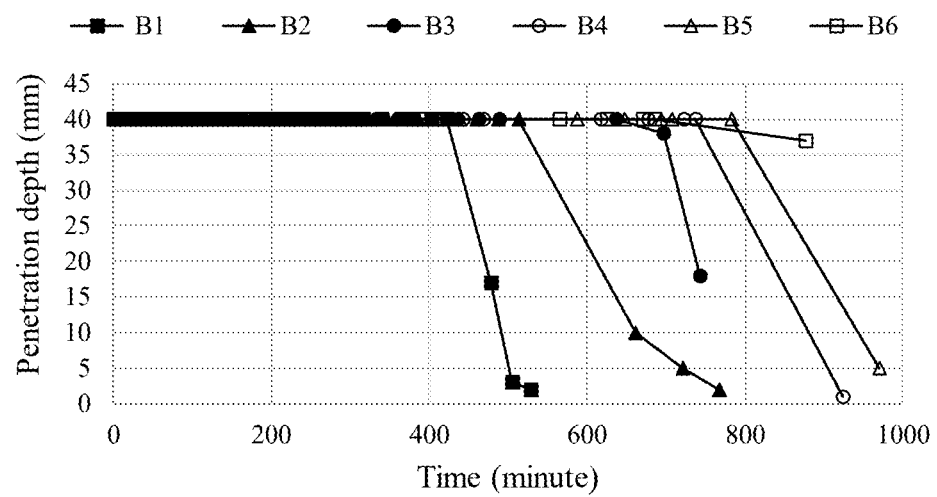
FIG. 4 illustrates the effect of EAFD % on the setting time of metakaolin/EAFD alkali-activated mixtures.

The Vicat needle penetration test results are provided in FIG. 4 for mixes B1 to B6 showing the effect of EAFD % on the setting time. The test was conducted on geopolymer pastes (i.e., mixes contained no sand) at room temperature of about 24° C. It is shown in FIG. 4 that setting time increases significantly with an increased percentage of EAFD. This shows that EAFD can be utilized in metakaolin-based geopolymer mixes to extend the setting time (i.e., functioning as a retarder).

Example 4

Enhanced Mechanical Properties

Figure 5:
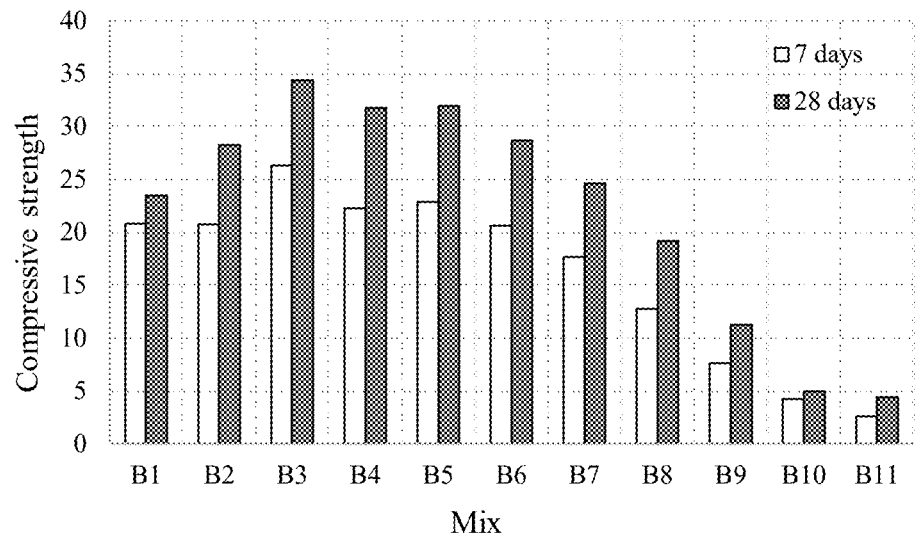
FIG. 5 illustrates the effect of EAFD % on the 7- and 28-days compressive strength of metakaolin/EAFD alkali-activated mixtures.

Compressive strength as a representation of all mechanical properties was evaluated at 7 and 28 days. FIG. 5 demonstrates the effect of substituting metakaolin by EAFD from 0 to 100% represented by the mixes B1 to B11. It is seen from the figure, relative to the mix with 100% metakaolin (i.e., no EAFD), the addition of EAFD at large quantities of up to 60% of the binder (B2-B7 mix) can improve the compressive strength at 28 days. However, the addition of EAFD at 70% (of the binder) resulted in a limited reduction in compressive strength. Significant deterioration in the compressive strength is observed when mortar mixes are made with 80% EAFD or more. This shows that EAFD can be utilized in the production of paste/mortar/concrete alkali-activated mixes at large volumes while improving the compressive strength.

Figure 6:
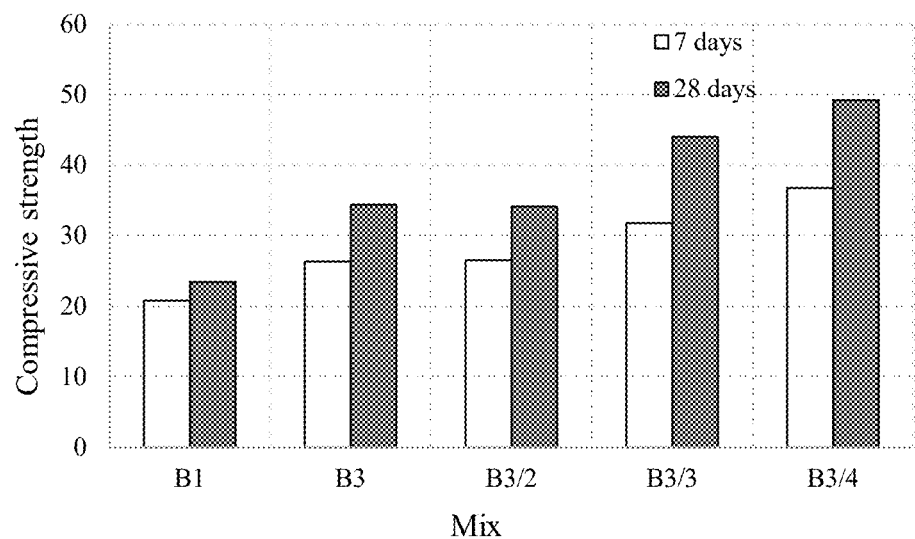
FIG. 6 illustrates the sensitivity of the 7- and 28-days compressive strength to the variations in the chemical composition of the EAFD.

The sensitivity of the compressive strength for the variation in the chemical composition of the EAFD is demonstrated in FIG. 6. The mixes B3, B3/2, B3/3 and B3/4 are made with 20% EAFD-A, 20% EAFD-B, 20% EAFD-C and 20% EAFD-D, respectively. It is seen that although all mixes having EAFD showed improved compressive strength compared to the control mix B1, the degree of improvement varied depending on the chemical composition, e.g., the mixes made with EAFD containing lower ZnO and higher CaO and MgO showed a higher degree of compressive strength improvement, e.g., B3/3 and B3/4 made with 20% EAFD-C and 20% EAFD-D, respectively. This shows that utilization of EAFD rich in CaO and MgO can be more beneficial in improving the mechanical properties of alkali-activated mixes containing EAFD.

Example 5

EAFD as a Water Reducer

Figure 7:
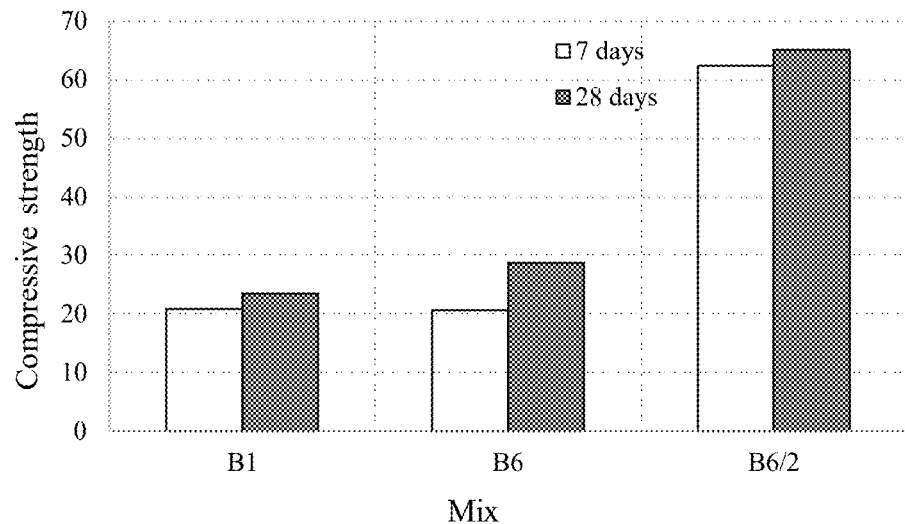
FIG. 7 illustrates the role of EAFD in reducing water to binder percentage and the positive effect on the 7- and 28-days compressive strength.

Benefiting from the excellent flowability properties of alkali-activated mixes containing EAFD, water to binder ratio can be significantly reduced in the metakaolin-based alkali-activated mix resulting in an enhanced compressive strength as demonstrated in FIG. 7. It was possible to reduce the water to binder ratio from 29.1% (B6 mix) to 11% (B6/2 mix), which resulted in almost doubling the 28 days compressive strength. This shows that EAFD can function in metakaolin-based geopolymer concrete mixes as a water reducer and further improve the compressive strength.

Example 6

Production of 100% EAFD Mixes

Figure 8:
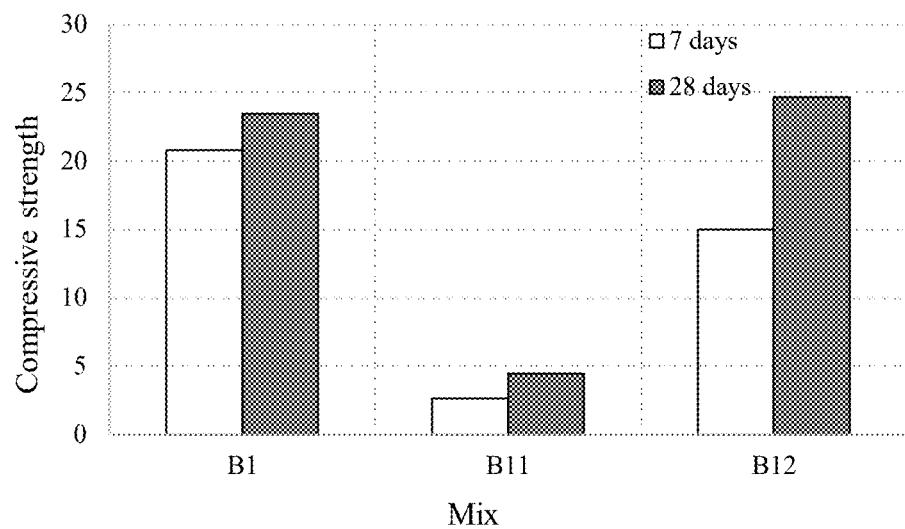
FIG. 8 illustrates the possibility of reducing the water to binder percentage for the production of 100% EAFD mix with good mechanical properties.

Owing to the excellent flowability properties of mixes containing large quantities of EAFD, mixes with 100% EAFD can be produced with good mechanical properties by reducing the water-to-binder ratio to the minimal, as demonstrated in FIG. 8. It was possible to produce an alkali-activated mix with 100% EAFD by reducing the water-to-binder percentage to a very low level (e.g., 5.1%). This can be seen in FIG. 8, in which the 28-day compressive strength for B12 achieved a strength comparable to the mix with 100% metakaolin (B1 vs. B12). This shows that mixes with 100% EAFD characterized by good mechanical properties can be produced by alkali-activation of EAFD by keeping the water-to-binder ratio at a low level.

Example 7

Use of EAFD as a Reducer for the Alkaline Activator

Figure 9:
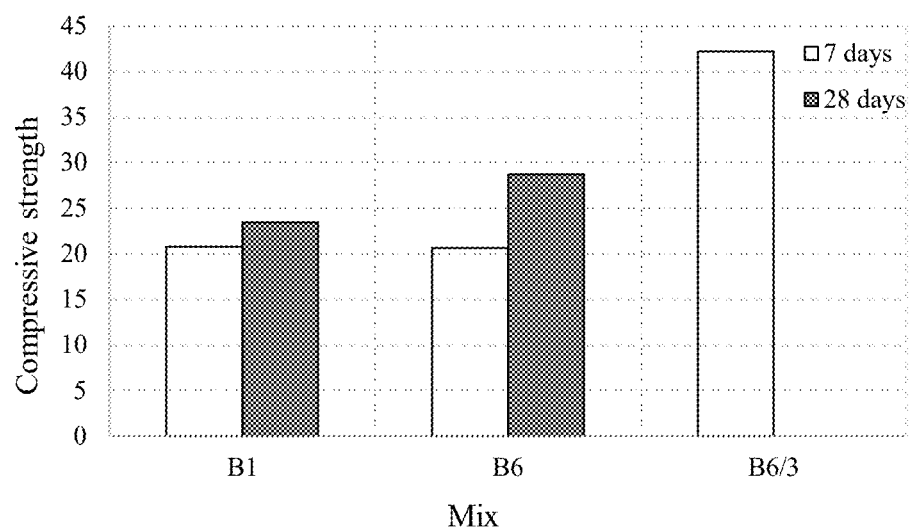
FIG. 9 illustrates the possibility of improving the economy of an alkali-activated mix as a result of adding EAFD.

An additional way of utilizing the possibility of reducing the water-to-binder ratio in alkali-activated mixes as a consequence of substituting metakaolin with EAFD can be by reducing the quantity of the relatively expensive alkaline activator while achieving the desired compressive strength or higher. This can be seen in the example of mix B6 vs. B6/3 shown in FIG. 9, in which the mix B6/3 has a reduced water/binder and alkaline activators and still has a higher compressive strength than the pure metakaolin mix (B6). This shows that alkali-activated metakaolin-based mixes can be produced with less alkaline solution content as a result of EAFD addition to the mixes.

It is to be understood that the method of synthesizing alkali-activated composites using EAFD described herein is not limited to the specific embodiments described above but encompasses any and all embodiments within the scope of the generic language of the following claims enabled by the embodiments described herein, or otherwise shown in the drawings or described above in terms sufficient to enable one of ordinary skill in the art to make and use the claimed subject matter.

I claim:

1. A method of making an alkali-activated composite, the method consisting of:
    mixing metakaolin and electric-arc furnace dust (EAFD) to obtain a binder, the binder comprising about 1% to about 90% by weight of the EAFD;
    adding an alkaline solution to the binder;
    mixing the alkaline solution and the binder to form a homogenous mixture;
    adding sand to the homogenous mixture to create a second mixture;
    mixing the second mixture until the second mixture is homogenous;
    casting the second mixture into a mold; and
    curing the second mixture to form the alkali-activated composite.

2. The method of claim 1, wherein the alkaline solution comprises sodium silicate and sodium hydroxide solids, with or without water.

3. The method of claim 1, wherein the EAFD comprises any combinations of $Fe_2O_3$, ZnO, $Na_2O$, CaO, MgO, $K_2O$, $SiO_2$, $SO_3$, $Al_2O_3$, MnO, $P_2O_5$, $TiO_2$, $V_2O_5$, $Cr_2O_3$, PBO, CdO, F, and Cl.

4. The method of claim 3, wherein the EAFD comprises a combination of CaO and MgO.

5. The method of claim 4, wherein the combination of CaO and MgO enhances mechanical properties of alkali-activated composite.

6. The method of claim 1, wherein the binder comprises up to 60% by weight of the EAFD.

7. The method of claim 1, wherein the EAFD is a water reducer and enhances compressive strength of the alkali-activated composite.

8. A method for disposal of electric-arc furnace dust (EAFD) by conversion into an alkali activated composite, the method consisting of:
    mixing an amount of metakaolin and an amount of EAFD to obtain a binder;
    adding an alkaline solution to the binder;
    mixing the alkaline solution and the binder to form a homogenous mixture;
    adding sand to the homogenous mixture to create a second mixture;
    mixing the second mixture until the second mixture is homogenous;
    casting the second mixture into a mold; and
    curing the second mixture to form the alkali activated composite;
wherein the binder comprises about 1% to about 90% by weight of the EAFD and at least 10% by weight of the metakaolin.

9. The method of claim 8, wherein the alkaline solution comprises sodium silicate and sodium hydroxide solids, with or without water.

10. The method of claim 8, wherein the EAFD comprises any combinations of $Fe_2O_3$, ZnO, $Na_2O$, CaO, MgO, $K_2O$, $SiO_2$, $SO_3$, $Al_2O_3$, MnO, $P_2O_5$, $TiO_2$, $V_2O_5$, $Cr_2O_3$, PBO, CdO, F, and Cl.

* * * * *